(12) United States Patent
Inaba

(10) Patent No.: US 7,760,266 B2
(45) Date of Patent: Jul. 20, 2010

(54) DIGITAL CAMERA

(76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 458 days.

(21) Appl. No.: 11/975,843

(22) Filed: Oct. 22, 2007

(65) Prior Publication Data
US 2008/0079849 A1    Apr. 3, 2008

(51) Int. Cl.
*H04N 5/225* (2006.01)
(52) U.S. Cl. .................. 348/374; 348/375; 348/373; 348/335
(58) Field of Classification Search ............. 720/664, 720/665
See application file for complete search history.

(56) References Cited

U.S. PATENT DOCUMENTS 6,963,365 B2   11/2005   Baron .................... 348/239
7,546,028 B2 *  6/2009   Nomura et al. ............. 396/55
2006/0007320 A1*  1/2006   Seo ..................... 348/219.1
2007/0035656 A1   2/2007   Inaba .................... 348/373
2008/0037980 A1*  2/2008   Okumura et al. .......... 396/535

* cited by examiner

*Primary Examiner*—David L Ometz
*Assistant Examiner*—Angel L Garces-Rivera
(74) *Attorney, Agent, or Firm*—Fattibene and Fattibene; Paul A. Fattibene

(57) ABSTRACT

A rack is inserted to a longitudinal rack mounting groove formed in both right and left end neighborhood on the backside of an image pickup substrate with a plate spring sandwiched therebetween. A right and left pair of racks are engaged with a horizontal pinion shaft. The rack is pressed to a pinion shaft by a spring force, there is no backlash, and the image pickup substrate is also kept in a state with no looseness. The image pickup substrate moves in parallel with a correct horizontal posture being kept up or down by turning the pinion shaft. A horizontal rack is provided at an upper part on the backside of the image pickup substrate, and performs a right and left shift by operating a vertical pinion shaft which is engaged therewith.

6 Claims, 9 Drawing Sheets

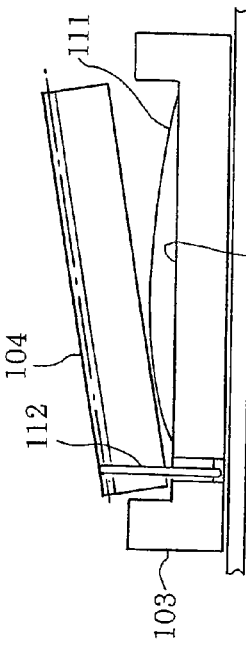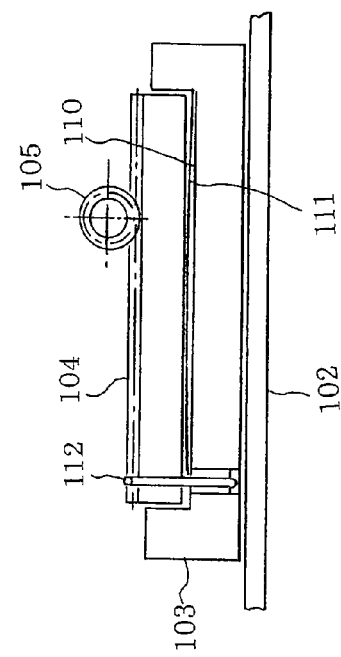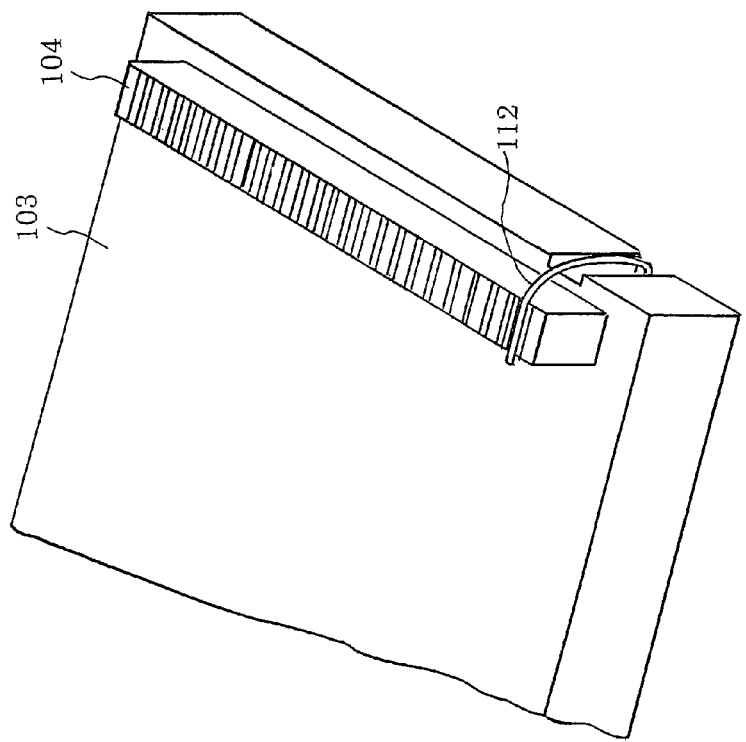

DIGITAL CAMERA

BACKGROUND OF THE INVENTION

1. Field of the Invention

The present invention relates to a digital camera provided with a perspective correction function and, more particularly, relates to a digital camera provided with a mechanical perspective correction mechanism.

2. Description of the Related Art

In the case where buildings such as a high-rise building or the like is photographed by a camera which is not provided with a shifting mechanism and a tilting mechanism of an imaging lens, it is usually photographed at an angle looking up at the buildings; and it becomes a perspective image in which the more upward vertical lines other than the screen center are, the closer the vertical lines get to the center side. In architecture photographs, deformation of a photographic subject due to such perspective is not preferable; and as photographing materials which can correct perspective for architecture photographs, there are a large-format view camera capable of freely shifting and tilting a photographing lens and an interchangeable lens for a single-lens reflex camera provided with a shifting mechanism and a tilting mechanism; however, there is a problem in that a device itself is large and price is costly.

In a digital image process field, there is provided application software which can freely modify an image; and if a portion that dwindles in a tapered shape toward on a digital image photographed by a digital camera is enlarged in a horizontal direction and a vertical length is adjusted by a perspective correction command of this kind of application software, an architecture photograph similar to an image photographed by a camera provided with the shifting mechanism and the tilting mechanism can be made.

However, a correction process such as magnification by application software is performed by scanning line magnification and an image interpolation process like digital zoom; therefore, deterioration of image quality is inevitable. In addition, image data photographed by a digital camera is usually compressed by nonreversible compression algorithm such as the joint photographic experts group (referred to as JPEG); therefore, there is a problem in that image quality deteriorates for each storage of data by performing the correction process.

A digital camera disclosed in Japanese Patent Application Laid-Open No. 2002-335438 is known as one which reduces a problem of such image quality deterioration to some degree. This digital camera incorporates a processor which can perform perspective correction with respect to image data output by an image pickup device, can reduce deterioration of image quality by performing perspective correction at a stage before data compression and storage, and can confirm a state of the perspective correction by a liquid crystal display (referred to as LCD) display provided in the camera before photographing.

The digital camera disclosed in Japanese Patent Application Laid-Open No. 2002-335438 does not need perspective correction with respect to image data after photographing and reduces trouble of a correction process due to application software and deterioration of image quality due to the correction process; however, a process which gradually enlarges magnification of horizontal scanning lines and magnification in a vertical direction from the bottom side to the upper side of the image and a pixel interpolation process are performed in photographing; therefore, there is a problem that substantial reduction in the number of pixels of the image pickup device generates deterioration of image quality as in digital zoom.

The present applicant has already filed a patent application (Japanese Patent Application No. 2005-233514) of a digital camera provided with a shifting mechanism of an image pickup substrate as a digital camera, which does not need an expensive interchangeable lens or the like provided with a lens shifting mechanism and can suppress deterioration of image quality as much as possible in perspective correction of such digital photographs. This digital camera is provided with a rack and pinion shifting mechanism which can arbitrarily shift an image pickup device in an X direction and a Y direction in a camera body. Accordingly, the perspective correction is performed by shifting the image pickup substrate in the Y direction or X direction while watching an LCD display before photographing; even in a shifting state, the number of effective pixels of the image pickup device is not different from that in anon-shifting state; and deterioration of image quality does not appear.

According to the digital camera (Japanese Patent Application No. 2005-233514) proposed by the present applicant, the perspective correction can be performed without deterioration of image quality; however, in order to keep optical accuracy at high level as a camera, it is required to prevent generation of posture change in the image pickup substrate to be shifted.

SUMMARY OF THE INVENTION

An object of the present invention is to provide a high-precision digital camera which approximates a backlash of a rack and pinion mechanism that shifts an image pickup substrate to zero as much as possible and prevents postural change of the image pickup substrate in a digital camera capable of performing perspective correction by an image pickup substrate shifting mechanism.

The present invention is proposed to achieve the above object. There is provided a digital camera which includes, in a body frame of the camera, a shifting mechanism that moves an image pickup substrate mounted with an image pickup device in parallel on an optical axis orthogonal surface; and which is configured so as to adjust perspective of an image to be imaged on an image pickup device by shifting the image pickup substrate by the shifting mechanism, wherein the shifting mechanism comprises a right and left pair of longitudinal racks arranged in both right and left end neighborhood on the surface or the backside of the image pickup substrate, and one horizontal pinion shaft supported on the body frame side, for engaging with the right and left pair of longitudinal racks. The right and left pair of longitudinal racks is fitted to a rack mounting groove formed on the surface or the backside of the image pickup substrate, and is biased to a lifting direction by a spring arranged in the rack mounting groove to come in elastic contact with the horizontal pinion shaft.

In the above configuration, a backlash between the rack and pinion is removed and the image pickup substrate is pressed to the body frame side by spring reaction force; therefore, the image pickup substrate does not generate a positional deviation due to external force such as vibration and centrifugal force.

Furthermore, there is provided a digital camera in which the rack has one end which is pressed by latching means such as a clip to suppress lift. In this configuration, the rack has the other end which rocks up and down with the one end as a fulcrum; therefore, excess lift can be suppressed at one end of the rack which is rocked in a state where a pinion shaft is engaged, and it is effective for stabilization of shift operation.

Furthermore, there is provided a digital camera in which the rack has both longitudinal end surfaces which are circular arc surfaces having a diameter equal to the entire length of the rack so as to smoothen rocking of the rack in the rack mounting groove.

Furthermore, there is provided a digital camera in which the rack has both longitudinal end surfaces which are circular arc surfaces, and the rack mounting groove has one longitudinal end surface which is a concave circular arc surface forming a turning pair with the circular arc surface of the rack.

In the rack having the both longitudinal end surfaces which are circular arc surfaces, even if the rack rocks with a movement of the image pickup substrate in shifting operation, the entire length dimension of the rack is constant; therefore, looseness of the rack with respect to the rack mounting groove can be solved by making the entire length of the rack and the entire length of the rack mounting groove equal.

Further, there is provided a digital camera which further includes a rack and pinion shifting mechanism which moves the image pickup substrate right and left in parallel in addition to the rack and pinion shifting mechanism which moves the image pickup substrate up and down in parallel. In this configuration, horizontal perspective distortion can also be corrected.

Furthermore, there is provided a digital camera which further includes a rack and pinion shifting mechanism which moves the image pickup substrate back and forth in parallel in addition to the rack and pinion shifting mechanism which moves the image pickup substrate up and down in parallel. In this configuration, focusing can be performed by shifting the image pickup substrate, but not the lens, back and forth.

According to the digital camera of the present invention, the rack is always pressed to the pinion by sandwiching the plate spring between the image pickup substrate and the rack; therefore, a backlash is not generated between the rack and the pinion, accuracy of the shifting mechanism improves, and correct shifting adjustment can be made. In addition, since the image pickup substrate is pressed to the body frame side by spring reaction force, the image pickup substrate is not likely to generate even an imperceptible positional deviation due to vibration, centrifugal force, and the like. Furthermore, a backlash can be removed with general accuracy of the rack and pinion, and assembly can be made without adjustment; therefore, it does not cause excessive increase in cost required for working and assembly.

Furthermore, the rack has one end which is pressed by latching means such as a clip to suppress lift; and accordingly, both ends of the rack can be prevented from symmetrically rocking by a spring with an intermediate part as a fulcrum, and smoothness in shifting operation and shifting operation accuracy are improved.

Furthermore, the rack has both longitudinal end surfaces which are circular arc surfaces having a diameter equal to the entire length of the rack; and accordingly, a rocking rack can be prevented from being locked in the rack mounting groove, and stability is improved. In addition, even if the entire length of the rack is conformed to the entire length of the rack mounting groove to be dimension with no looseness, it does not exert a harmful influence on engagement of the rack and pinion, and there is not looseness of the rack with respect to the mounting groove; therefore, shifting operation accuracy and operation sense are further improved.

Further, in the case where the rack has both longitudinal end surfaces which are circular arc surfaces and the rack mounting groove has one longitudinal end surface which is a concave circular arc surface forming a turning pair with the circular arc surface of the rack, the rack rocks in a state where one end of the rack is fitted to the circular arc surface at one end of the rack mounting groove; and accordingly, both ends of the rack can be prevented from symmetrically rocking with an intermediate part as a fulcrum, and smoothness in shifting operation and shifting operation accuracy are improved as in the case where the rack has one end which is pressed by latching means such as a clip to suppress lift.

Furthermore, a rack and pinion shifting mechanism which moves the image pickup substrate right and left in parallel is included in addition to the rack and pinion shifting mechanism which moves the image pickup substrate up and down in parallel; and accordingly, not only vertical and horizontal perspective distortion can be corrected, but also vertical perspective distortion of construction or the like can be corrected even when the camera is in a longitudinal position.

Furthermore, a rack and pinion shifting mechanism which moves the image pickup substrate back and forth in parallel is included in addition to the rack and pinion shifting mechanism which moves the image pickup substrate up and down in parallel, and a perspective correction mechanism and a focusing mechanism are united; and accordingly, there is an effect of simplifying mechanism configuration.

BRIEF DESCRIPTION OF THE DRAWING

FIGS. 4A, 4B, and 4C show an image pickup substrate shifting mechanism of another embodiment in which FIG. 4A is a perspective view, FIG. 4B is a side view before assembly of a pinion; and FIG. 4C is a side view after assembly of the pinion;

DESCRIPTION OF THE PREFERRED EMBODIMENT

The present invention is a digital camera which includes, in a body frame of the camera, a shifting mechanism that moves an image pickup substrate mounted with an image pickup device in parallel on an optical axis orthogonal surface, and which is configured so as to adjust perspective of an image to be imaged on an image pickup device by shifting the image pickup substrate by the shifting mechanism, wherein the shifting mechanism includes a right and left pair of longitudinal racks arranged in both right and left end neighborhood on the surface or the backside of the image pickup substrate; and one horizontal pinion shaft supported on the body frame side, for engaging with the right and left pair of longitudinal racks. The right and left pair of longitudinal racks is fitted to a rack mounting groove formed on the surface or the backside of the image pickup substrate, and is biased to a lifting direction by a spring arranged in the rack mounting groove to come in elastic contact with the horizontal pinion shaft; and accordingly, it is possible to achieve an object of approximating a backlash of the rack and pinion mechanism which shifts the image pickup substrate to zero as much as possible in the digital camera capable of performing perspective correction by the image pickup substrate shifting mechanism, and preventing postural change of the image pickup substrate.

Embodiment 1

Figure 1:
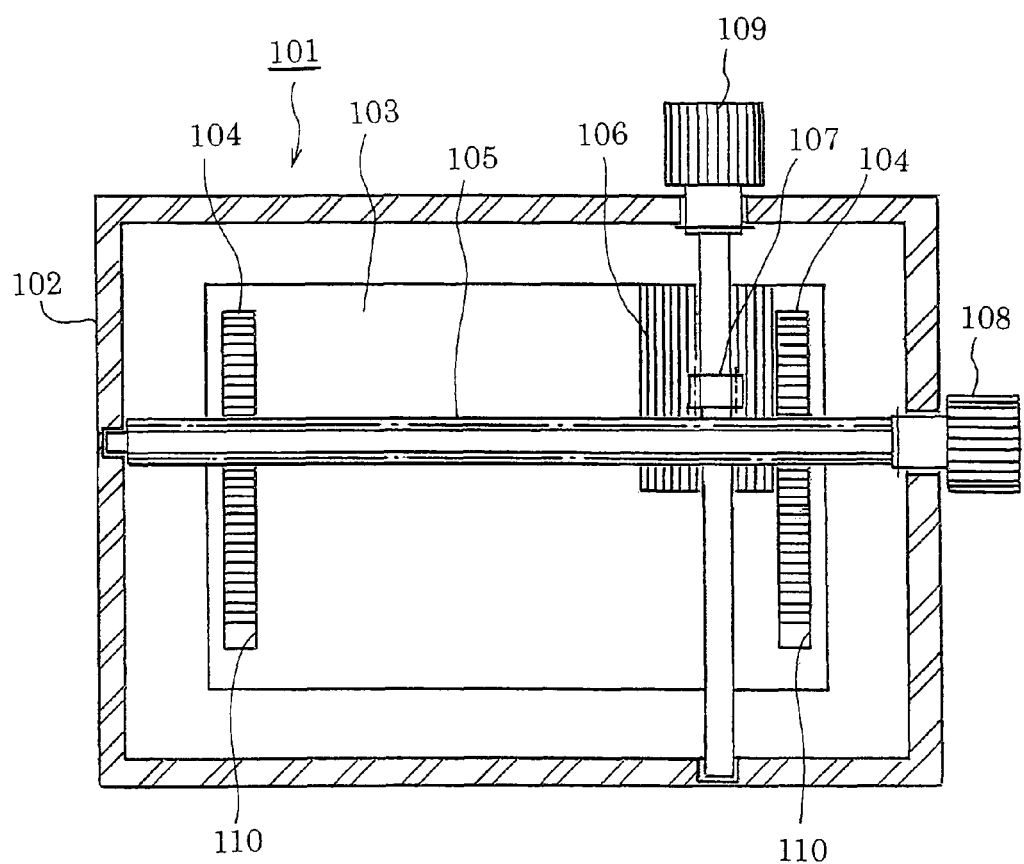
FIG. 1 is a rear cross-sectional view showing a digital camera of one embodiment according to the present invention.

FIG. 1 is a rear cross-sectional view showing a digital camera 101 according to the present invention; a photographing lens unit (not shown in the drawing) is arranged at the center of the front surface (the back of the page space in the drawing) of a box body frame 102; light passing through the photographing lens is made incident on a central part of an image pickup substrate 103 arranged on the back side of the front wall surface (the front side in FIG. 1) of a body frame; and an image pickup device (not shown in the drawing) mounted on a central part of the image pickup substrate 103 receives the light.

A longitudinal rack 104 is provided at each of both right and left ends on the backside of the image pickup substrate 103; and these two racks 104 are engaged with one long horizontal pinion shaft 105 provided so as to bridge right and left wall surfaces of the body frame 102. In addition, a lateral direction rack 106 is provided at a right upper part of the backside of the image pickup substrate 103, and the rack 106 is engaged with one vertical pinion shaft 107 provided so as to bridge upper and lower wall surfaces of the body frame 102.

As in the previously described earlier application of the present applicant (Japanese Patent Application No. 2005-233514), operation knobs 108 and 109 are mounted to the horizontal pinion shaft 105 and the vertical pinion shaft 107, respectively; the image pickup substrate 103 moves up and down in parallel in response to a turning direction of the operation knob 108 when the operation knob 108 of the horizontal pinion shaft 105 is turned; the image pickup substrate 103 moves right or left in parallel in response to a turning direction of the operation knob 109 when the operation knob 109 of the vertical pinion shaft 107 is turned; and accordingly, the image pickup device moves to an orthogonal direction with respect to an optical axis of the photographing lens to adjust perspective, and a state of the perspective can be visually checked by an electronic display (not shown in the drawing) arranged on the backside of the digital camera 101.

Figure 2:
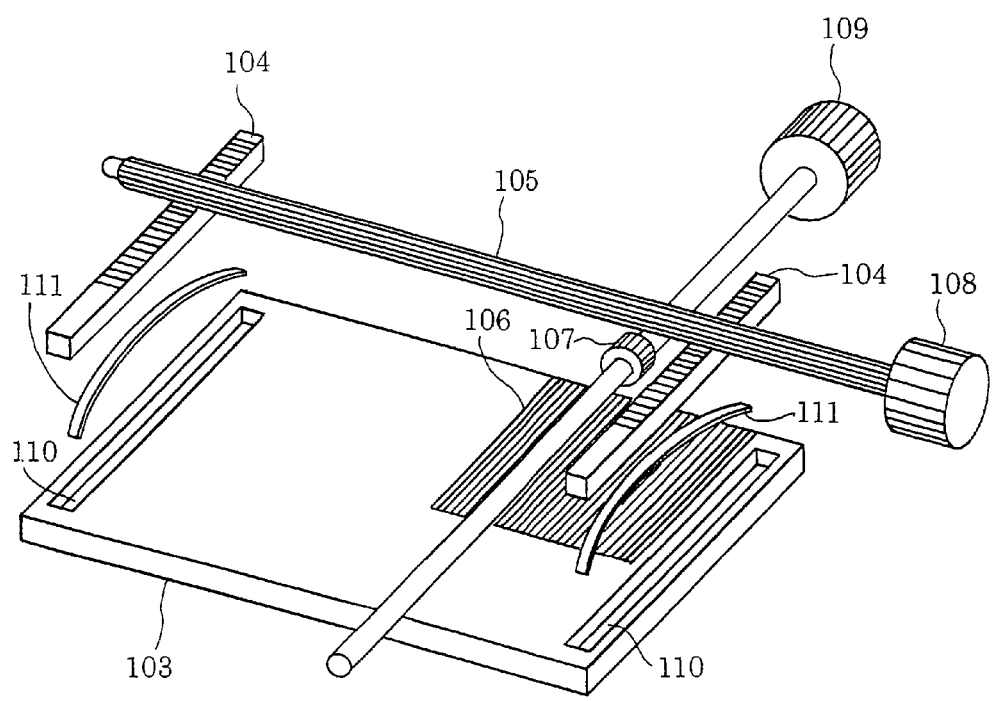
FIG. 2 is an assembly view showing an image pickup substrate shifting mechanism.

FIG. 2 shows the rack and pinion mechanism, which is configured such that a longitudinal rack mounting groove 110 is formed at each of both right and left ends on the backside of the image pickup substrate 103; a circular arc plate spring 111 is inserted to the rack mounting groove 110; and the rack 104 having a similar shape to the rack mounting groove 110 is fitted from above; and the rack 104 is pressed from above by the horizontal pinion shaft 105. In addition, although it is described that the rack mounting groove 110 is directly formed on the image pickup substrate 103, 103 may be not an image pickup substrate, but a substrate holder and the image pickup substrate may be mounted on the front surface of the substrate holder.

Figure 3A:
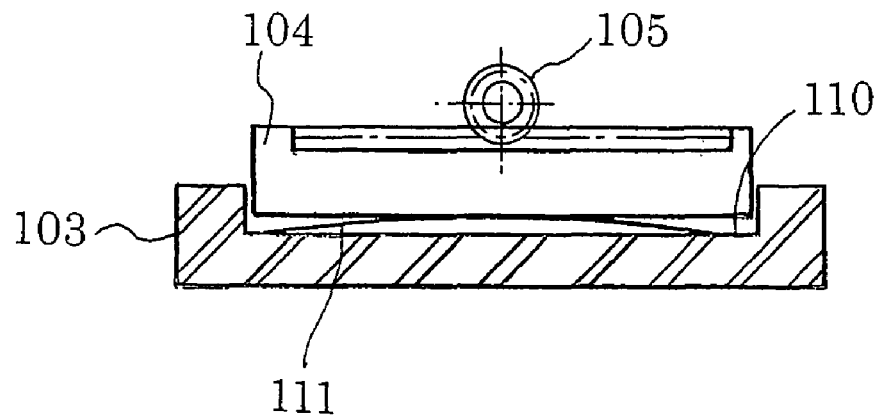
FIGS. 3A and 3B are cross-sectional views showing the image pickup substrate shifting mechanism, respectively.

As shown in FIG. 3A, the rack 104 is biased to a lifting direction from the image pickup substrate 103 by the plate spring 111 to come in elastic contact with the horizontal pinion shaft 105, and a backlash between the rack 104 and the horizontal pinion shaft 105 is zero. Reaction force to be applied to the plate spring 111 presses the image pickup substrate 103 to an inner wall surface of the body frame 102 of the camera and a looseness is not generated; therefore, the image pickup substrate 103 is not displaced up and down (right and left in the drawing) due to gravity and vibration, and operability of the operation knob 108 is also good without looseness.

Figure 3B:
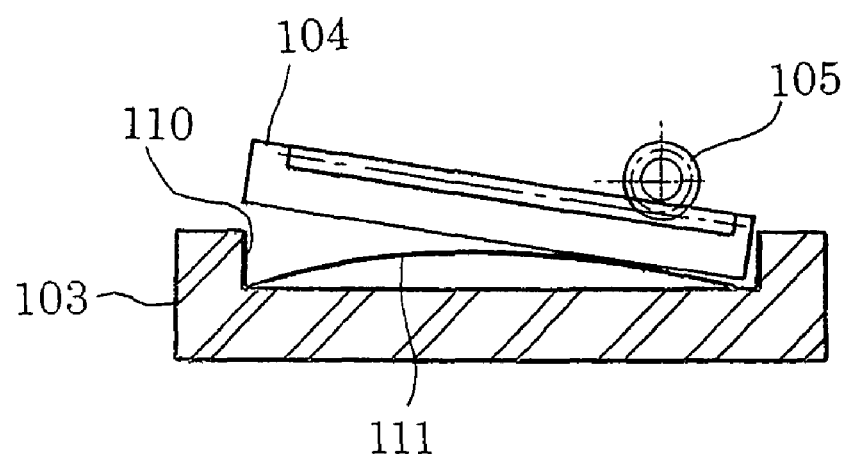

FIG. 3B shows a state where the image pickup substrate 103 is shifted from an intermediate position to one side by turning the horizontal pinion shaft 105, and the same drawing shows an exaggerated postural change of the rack 104; however, in this manner, the rack 104 has both ends which rock up and down with an abutting point with the plate spring 111 as a fulcrum, and the rack 104 and the image pickup substrate 103 shift while a backlash between the rack 104 and the horizontal pinion shaft 105 is zero. However, depending on design dimension of the rack 104 and the rack mounting groove 110 and a shape of the plate spring 111, as shown in the drawing, it is conceivable that one end of the rack 104 might be lifted to the extent that it disengages from the rack mounting groove 110 when the rack 104 is shifted.

FIGS. 4A to 4C show an embodiment which prevents lift of the rack 104, and one end of the rack 104 is fixed to the image pickup substrate 103 by an elastic clip 112 as shown in the drawings. In a state where one end of the rack 104 is being fixed by the elastic clip 112, the other end of the rack 104 is largely lifted upward as shown in FIG. 4B; however, as shown in FIG. 4C, when the horizontal pinion shaft 105 is engaged with the rack 104, a backlash between the rack 104 and the horizontal pinion shaft 105 is removed, and excess lift at the one end of the rack 104 is prevented irrespective of a shifting position.

Figure 5:
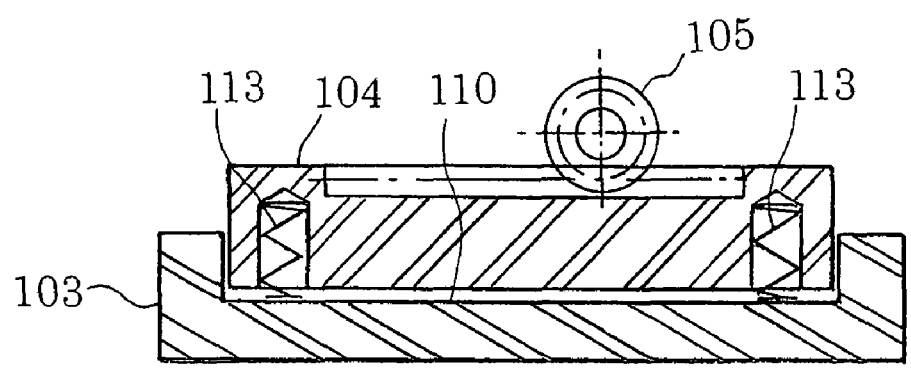
FIG. 5 is a side sectional view showing an image pickup substrate shifting mechanism of another embodiment.

FIG. 5 shows another embodiment which prevents excess lift of the rack 104; a coil spring 113 is inserted to each hole formed on both lower surface ends of the rack 104; and the rack 104 is lifted by a pair of the coil springs 113 in place of the plate spring 111 to be brought into elastic contact with the horizontal pinion shaft 105.

In addition, as for the rack 106 for moving horizontally, which is mounted on the backside of the image pickup substrate 103 shown in FIG. 1, if the rack 106 is not a discrete component, but is directly formed on the image pickup substrate 103, its manufacture becomes easier and the product can be reduced in size. Furthermore, in FIG. 1, a peripheral wall itself of the body frame 102 serves as a bearing of the horizontal pinion shaft 105 and the vertical pinion shaft 107; however, if a bush made of oilless metal, bearing resin, or the like is inserted to a hole formed in the peripheral wall, improvement in operation smoothness and durability can be expected.

Embodiment 2

Figure 6:
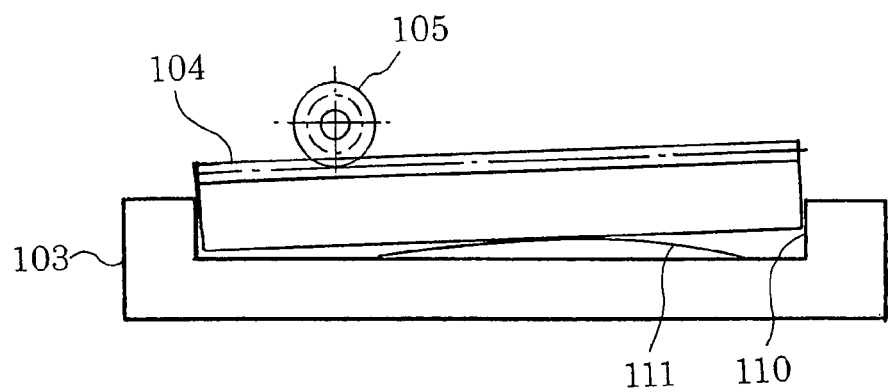
FIG. 6 is a side sectional view showing an image pickup substrate shifting mechanism.

In Embodiment 1, a shape of the rack is not particularly mentioned, but there is shown the rack 104 whose both end surfaces are vertical surfaces. In this case, in order for the rack 104 to be rocked in the rack mounting groove 110, the length of the rack 104 needs to be slightly shorter than that of the rack mounting groove 110; and consequently, looseness is generated. In addition, in the case where the rack 104 tilts largely as shown in FIG. 6, the rack 104 rubs both ends of the rack mounting groove 110 and it is likely to be locked.

Figure 7:
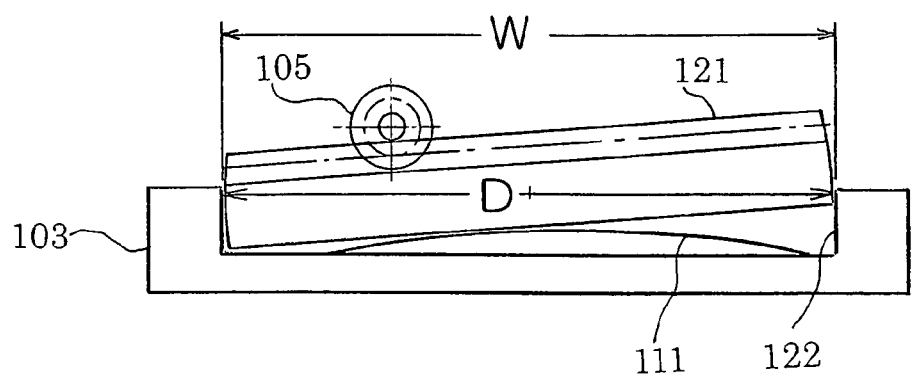
FIG. 7 is a side sectional view showing an image pickup substrate shifting mechanism of another embodiment.

A rack 121 shown in FIG. 7 is one which solves the above problem; if both end surfaces of the rack 121 are a circular arc having a diameter D equal to the entire length D (distance between both end surfaces) of the rack 121, the rack 121 can be smoothly rocked even if the entire length D of the rack 121 equals an interval W between both end vertical wall surfaces of a rack mounting groove 122 (W=D) and a clearance between the rack 121 and the rack mounting groove 122 is zero.

Embodiment 3

Figure 8:
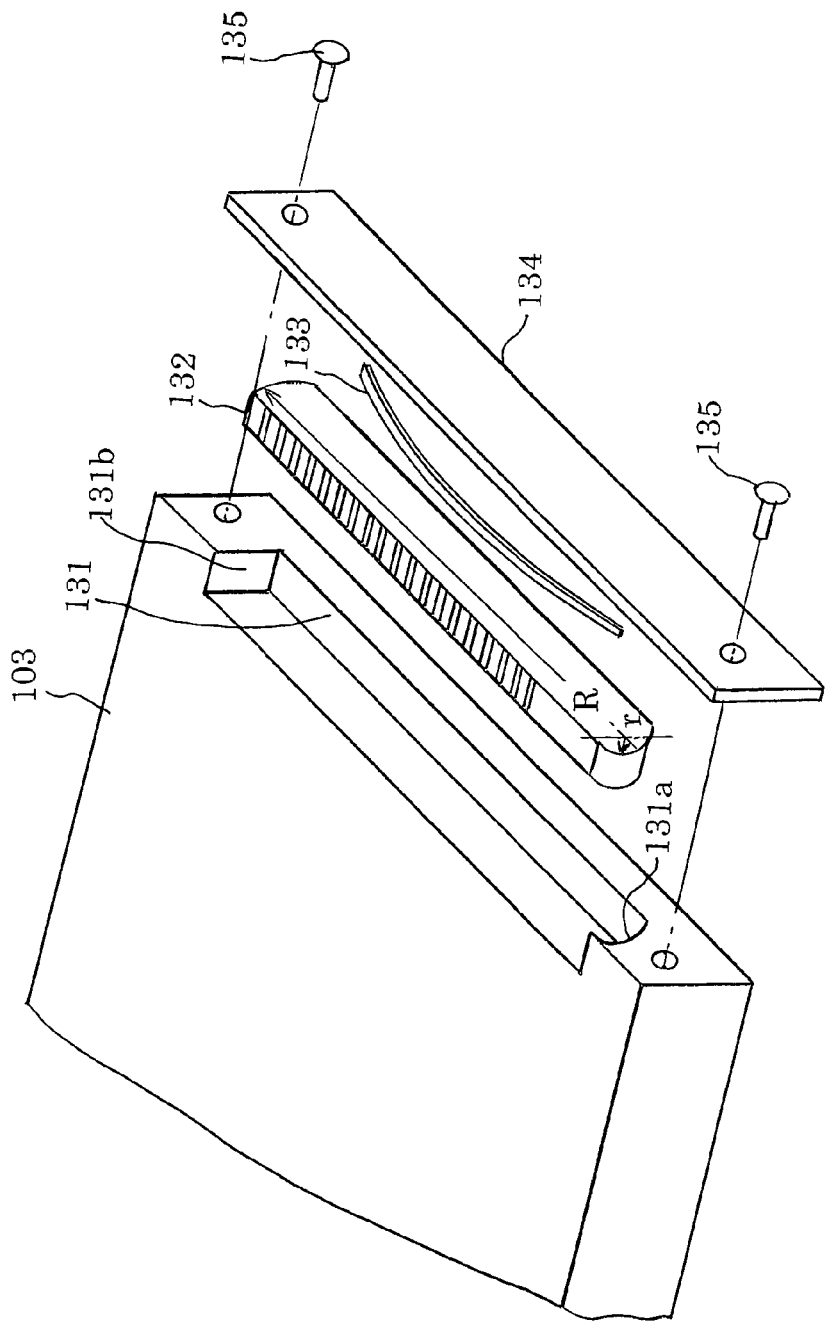
FIG. 8 is an assembly view showing an image pickup substrate shifting mechanism of another embodiment.

FIG. 8 is one which forms a rack mounting groove 131 whose backside side and side surfaces are opened on both right and left corners of the backside (above in the drawing) of the image pickup substrate 103, and a rack 132 is mounted to the rack mounting groove 131 whose backside side and side surfaces are opened. One end of the rack 132 is formed to be a circular arc shape of a radius r with a center point C of one longitudinal end neighborhood of the rack 132 as the center, and the other end of the rack 132 is also formed to be a circular arc shape of a radius R with the center point C as the center. A wall surface 131a at one end of the rack mounting groove 131 is a circular arc concave surface forming a fitting pair to an end surface of the radius r of the rack 132, and a wall surface 131b at the other end is a vertical surface (surface perpendicular to a moving direction of the image pickup substrate) coming in contact with a circular arc part of the radius R of the rack 132.

A plate spring 133 is placed on the bottom surface of the rack mounting groove 131, the rack 132 is inserted to the rack mounting groove 131 from the side, a plate 134 which prevents the rack 132 from dropping off is fixed to the side surface of the image pickup substrate 103 with a pin 135 or a screw. Consequently, the rack 132 is swingably held up and down with the center point C as a fulcrum.

Furthermore, it may be configured such that a pinhole is formed at the center point C of the rack 132 and the rack 132 is swingably fixed to the image pickup substrate 103 with a pin in place of a method which mounts the plate 134 to the side surface of the image pickup substrate 103.

Figure 9:
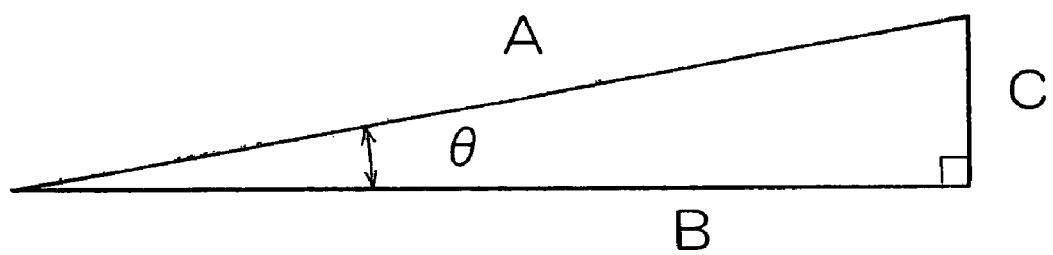
FIG. 9 is a diagram for explaining a deviation in the amount of shift due to the amount of rocking of a rack of an image pickup substrate shifting mechanism.

In the present invention which removes a backlash between the rack and the pinion by making the aforementioned right and left pair of racks swingable, it will be verified how much horizontal tilt of the image pickup substrate is generated when the image pickup substrate shifts, by a deviation in cut depths of tooth parts of a right and left set of racks. In FIG. 9, when a side B is considered to be parallel to the image pickup substrate, the amount of backlash correction (the amount of rocking at an engagement point with the rack) is a side C and the length from a rocking fulcrum of the rack to an engagement point with the pinion is A, an angle θ shown in the drawing is $\sin^{-1}(C/A)$; and when a backlash is 0.2 mm, and the length A from the rack fulcrum to the engagement point is 20 mm:

$$\theta = \sin^{-1}(C/A) = \sin^{-1}(0.2/20) = \sin^{-1} 0.01 = 0°34'$$

and accordingly, the length of the side B is as follows:

$$B = A \cos \theta = 20 \cdot \cos 0°34' = 19.999 \text{ mm.}$$

That is, it is understood that when the length A from the rocking fulcrum of the rack to the engagement point is 20 mm, a position of the image pickup substrate differs by only 20 mm−19.999 mm=1/1000 mm even if the rack is in a tilted state by θ shown in the drawing (the amount of backlash correction 0.2 mm) by backlash correction. This means that even the deviation in cut depths of tooth parts of a right and left set of racks for moving vertically is 0.2 mm, for example, a horizontal positional deviation of the image pickup substrate is approximately 1/1000 mm and is negligible; therefore, general accuracy control is enough for production, special accuracy control for components and adjustment in assembling are not required, and a high-precision shifting mechanism can be realized.

In addition, in a still camera of a rectangular screen with different size in height and width of screen, there are cases where the camera photographs at a lateral position and where the camera photographs at a longitudinal position (posture turned by 90 degrees around the optical axis from the lateral position); the above described digital camera is provided with the shifting mechanism capable of sliding the image pickup device in a Y direction (vertical direction) and an X direction (horizontal direction) so as to adjust perspective of vertical lines at both the lateral position and longitudinal position. However, in a video movie camera, since there is not a case where the camera photographs at a longitudinal position, only the Y direction shifting mechanism (rack 104 and horizontal pinion shaft 105) is enough when the shifting mechanism is provided in the video movie camera.

Furthermore, even in a digital stereo camera provided with two optical systems right and left, the optical system being composed of a photographing lens and an image pickup device, the camera does not photographs at a longitudinal position; therefore, only the Y direction shifting mechanism is enough; and it may be configured such that an image pickup substrate provided with a right and left pair of the image pickup devices by enlarging a lateral width of the image pickup substrate 103 shown in FIGS. 1 and 2 can be shifted up and down by the rack 104 and the horizontal pinion shaft 105.

Embodiment 4

Figure 10:
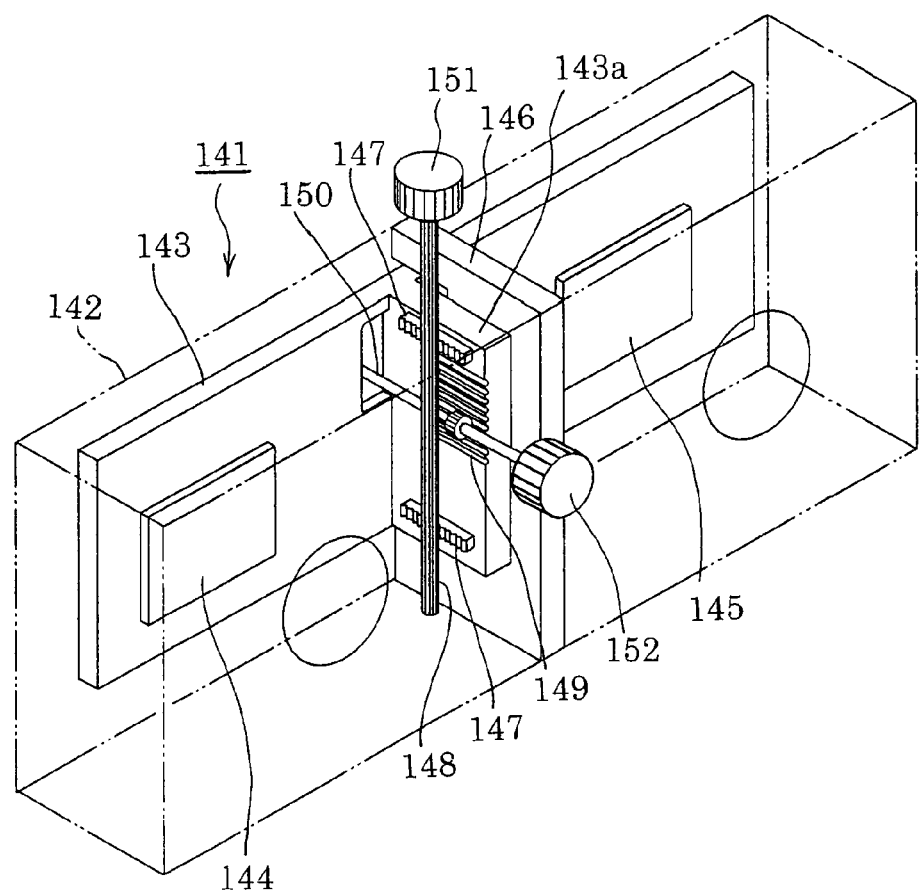
FIG. 10 is a perspective view showing an image pickup substrate shifting mechanism of another embodiment.

A modification of the above described shifting mechanism is shown in FIG. 10. The shifting mechanism shown in FIGS. 1 and 2 is one which shifts the image pickup substrate 103 in the X direction and the Y direction on the optical axis orthogonal surface; however, in the case where an X direction shifting mechanism is not required like the stereo camera, the image pickup substrate may be shifted in the Y direction and a Z direction (optical axis direction) by changing arranging directions of two shifting mechanisms. In this case, perspective correction is performed by a Y direction shifting mechanism; and focusing is performed by a Z direction shifting mechanism.

FIG. 10 shows a digital stereo camera 141 provided with the Y direction shifting mechanism and the Z direction shifting mechanism, and inner wall surfaces of a body frame 142 are shown by dashed double-dotted lines. A central vertical wall 143a protruding from the front surface center to the front is formed on a horizontally long image pickup substrate (or image pickup substrate holder) 143, and a right and left pair of image pickup devices 144 and 145 are mounted right and left with the central vertical wall 143a sandwiched therebetween. The central vertical wall 143a comes in contact with a vertical partition wall 146 fixed at the horizontal center of the body frame 142, and the image pickup substrate 143 is movable in the Y direction and the Z direction in a state where the central vertical wall 143a comes in contact with the vertical partition wall 146 of the body frame 142.

A rack 147 is provided horizontally in an anteroposterior direction in each neighborhood of both up and down ends on the side surface of the central vertical wall 143a provided on the image pickup substrate 143, and an up and down pair of the racks 147 are engaged with a vertical pinion shaft 148 mounted to the body frame 142 to constitute the Z direction shifting mechanism. In addition, a longitudinal rack 149 is formed on the side front end of the central vertical wall 143a, and the rack 149 is engaged with a horizontal pinion shaft 150 mounted to the body frame 142 to constitute the Y direction shifting mechanism.

A structure of the rack 147 of the Z direction shifting mechanism is one which employs any one of structures of the spring-mounted racks 104, 121, and 132 described in Embodiments 1 to 3; the rack 147 comes in elastic contact with the vertical pinion shaft 148 by a spring (not shown in the drawing) and a backlash is zero. When an operation knob 151 of the vertical pinion shaft 148 is turned, the image pickup substrate 143 moves back and forth in parallel in accordance with a turning direction of the operation knob 151, and focusing of a photographing lens (not shown in the drawing) can be made.

A structure of the Y direction shifting mechanism is the same as that of the X direction shifting mechanism (rack 106 and pinion shaft 107) described in Embodiments 1 to 3; when an operation knob 152 of the horizontal pinion shaft 150 is turned, the image pickup substrate 143 moves up and down in parallel in accordance with a turning direction of the operation knob 150, and perspective can be corrected. The central vertical wall 143a of the image pickup substrate 143 is pressed to the vertical partition wall 146 of the body frame 142 by a reaction force of the spring intervening the rack 147; therefore, the image pickup substrate 143 has no looseness and can be smoothly moved in the Y direction and the Z direction.

As for the Z direction shifting mechanism (focusing mechanism), the vertical pinion shaft 148 may be configured to be driven by a stepping motor so as to form an auto focusing type which controls the stepping motor by an auto focusing function of a photographing control unit, or so as to form a switch operation type motor driven focusing mechanism. Furthermore, it may be configured such that the Z direction shifting mechanism and the Y direction shifting mechanism shown in FIG. 10 are interchanged by arranging a pair of spring-mounted racks 147 at a longitudinal position and by arranging the rack 149 horizontally.

The present invention is not limited to the above embodiments; but, various changes and modifications can be made within the scope of the present invention. Only the case of the digital camera is described; however, the shifting mechanism according to the present invention can be applied to other equipment, for example, an X-Y micromotion device or the like of a stage in a microscope, and it goes without saying that the present invention covers such changes and modifications.

What is claimed is:

1. A digital camera which includes, in a body frame of the camera, a shifting mechanism that moves an image pickup substrate mounted with an image pickup device in parallel on an optical axis orthogonal surface and which is configured so as to adjust perspective of a screen to be imaged on an image pickup device by shifting the image pickup substrate by the shifting mechanism,
   wherein the shifting mechanism comprises a right and left pair of longitudinal racks arranged in both right and left end neighborhood on the surface or the backside of the image pickup substrate, and one horizontal pinion shaft supported on the body frame side, for engaging with the right and left pair of longitudinal racks, and
   the right and left pair of longitudinal racks is fitted to a rack mounting groove formed on the surface or the backside of the image pickup substrate, and is biased to a lifting direction by a spring arranged in the rack mounting groove to come in elastic contact with the horizontal pinion shaft.

2. The digital camera according to claim 1, wherein the rack has one end which is pressed by latching means such as a clip to suppress lift.

3. The digital camera according to claim 1, wherein the rack has both longitudinal end surfaces which are circular arc surfaces having a diameter equal to the entire length of the rack so as to smoothen rocking of the rack in the rack mounting groove.

4. The digital camera according to claim 1, wherein the rack has both longitudinal end surfaces which are circular arc surfaces, and
   the rack mounting groove has one longitudinal end surface which is a concave circular arc surface forming a turning pair with the circular arc surface of the rack.

5. The digital camera according to claim 1, further comprising a rack and pinion shifting mechanism which moves the image pickup substrate right and left in parallel in addition to the rack and pinion shifting mechanism which moves the image pickup substrate up and down in parallel.

6. The digital camera according to claim 1, further comprising a rack and pinion shifting mechanism which moves the image pickup substrate back and forth in parallel in addition to the rack and pinion shifting mechanism which moves the image pickup substrate up and down in parallel.

* * * * *